United States Patent [19]

Hubbard

[11] 4,174,054
[45] Nov. 13, 1979

[54] VOLUMETRIC FEEDER FOR METERING PARTICULATE MATERIAL

[76] Inventor: Elbert G. Hubbard, 6 N. 111 Gary Ave., Keeneyville, Ill. 60172

[21] Appl. No.: 929,220

[22] Filed: Jul. 31, 1978

[51] Int. Cl.² .............................................. G01F 11/20
[52] U.S. Cl. ................................... 222/241; 222/242; 222/564
[58] Field of Search ............... 222/239, 240, 241, 242, 222/564, 236

[56] References Cited

U.S. PATENT DOCUMENTS

| 741,125 | 2/1868 | Pickens | 222/242 |
| 3,193,155 | 7/1965 | Hazen | 222/240 X |
| 3,804,303 | 4/1974 | Fassauer | 222/242 X |

*Primary Examiner*—Allen N. Knowles
*Attorney, Agent, or Firm*—James E. Tracy

[57] ABSTRACT

Highly accurate metering of particulate material is achieved by employing a rotatably mounted agitator to initially move the material radially outward to the periphery of a horizontally-disposed, stationary, circular, flat support plate, from which it falls, under the guidance of a cylindrical wall depending from the plate's periphery, to an annular-shaped support area of a horizontally-disposed, stationary, circular, flat metering plate. A rotatably mounted metering rotor, driven concurrently with the agitator, sweeps the particulate material radially inward from the support area to a centrally located discharge orifice in the metering plate. With such an arrangement, the particulate material will be maintained in an uncompacted state and the mixture will remain homogeneous, with the result that the volume of the material flowing through the discharge orifice will be directly proportional to the number of revolutions of the metering rotor. A precise volume may thus be fed to a collection station.

9 Claims, 7 Drawing Figures

VOLUMETRIC FEEDER FOR METERING PARTICULATE MATERIAL

BACKGROUND OF THE INVENTION

This invention relates to a feeding mechanism for metering a precise volume of particulate material.

Most particulate materials are comprised of both larger particles and more finely divided, powdery particles in an approximately randomly distributed mixture. Because of this random distribution, a mass of particulate material has a homogeneous aspect in that two randomly selected equal volumes of uncompacted material should include essentially the same mixture of coarser particles and more finely divided particles so that the same mass of material is present in the two volumes. When preselected masses of particulate material are volumetrically metered, it is imperative that the material be maintained in a state of uniform compactness so that successive volumetric units metered from a quantity of the material will contain the same mass. Moreover, the particulate material must be handled prior to volumetric metering in a manner so that the random distribution of coarser and nore finely divided material is not disturbed; that is, so that the powdery and granular constituents of the material are not stratified and separated out from one another.

Metering systems have been developed for feeding accurate quantities of particulate material. However, such systems are usually of complex and costly construction. Furthermore, a high degree of accuracy is obtainable only over a small range of masses. In contrast, the metering system of the present invention is of relatively simple and inexpensive construction and yet it is capable of dispensing particulate material, in an uncompacted and homogeneous condition, with a high degree of accuracy over a wide range of masses.

SUMMARY OF THE INVENTION

The volumetric feeder of the present invention comprises a stationary pressure relief member having a horizontally-disposed, circular, flat support plate and a cylindrical guide wall depending therefrom. Means are provided for maintaining particulate material on the support plate. An agitator is rotatably mounted above the support plate for sweeping the particulate material radially outward so that it flows down the guide wall. Mounted below the pressure relief member is a horizontally-disposed stationary circular, flat metering plate, having a centrally located discharge orifice, for receiving and supporting the particulate material flowing down the guide wall. The volumetric feeder also includes a metering rotor, rotatably mounted between the pressure relief member and the metering plate, for sweeping the particulate material radially inward over the metering plate and through the discharge orifice.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which like reference numbers identify like elements, and in which:

DESCRIPTION OF THE ILLUSTRATED EMBODIMENT

Figure 1:
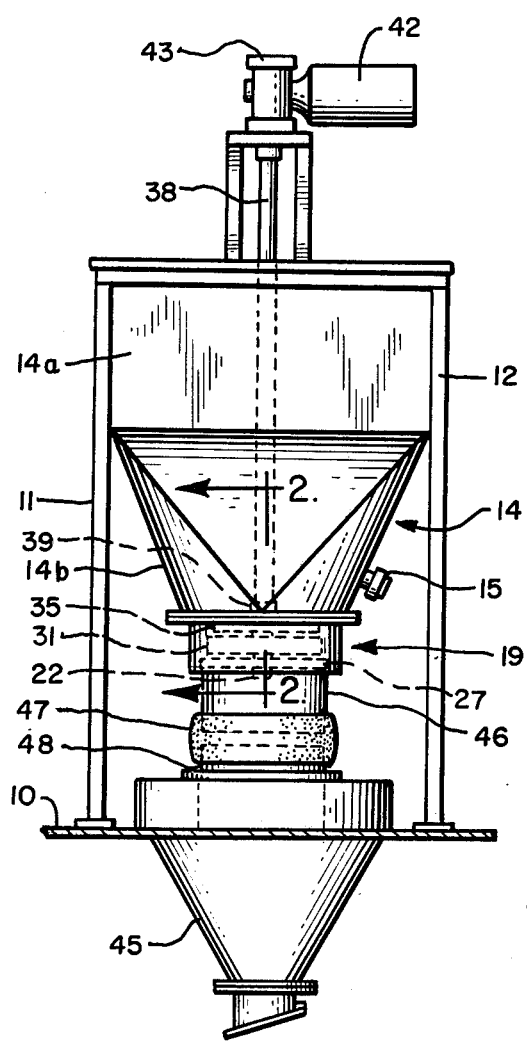
FIG. 1 is a front view of a volumetric feeder constructed in accordance with one embodiment of the invention.

As seen in FIG. 1, the entire feeding mechanism is mounted to and supported by a horizontally-disposed support member or deck 10, which in turn may be fixed in position in any convenient fashion. For example, vertical legs (not shown) may be employed to hold support member 10 above a floor. If desired, several separate feeding mechanisms could be supported on the same deck structure 10, with each mechanism feeding a different particulate material or ingredient into a mixer or collecting hopper. Vertical support walls 11 and 12 are secured to deck 10 and provide support for a storage hopper 14, the upper portion 14a of which constitutes a square bin while the lower portion 14b is essentially a truncated cone, having a square cross-section at the top and a circular cross-section at the bottom. The particulate material to be metered is deposited in storage hopper 14. A level control or sight glass 15, on hopper portion 14b, facilitates visual monitoring of the material in the hopper to ensure that material will always be available when it is needed.

A series of circumferentially spaced bolts 16 and nuts 17 (see FIG. 2) secure the circular lower end of hopper 14 to a base member 19 having a vertically-disposed cylindrical wall 19a and a horizontally-disposed, annular-shaped flat plate 19b. Base 19 has a series of four equally-spaced spokes 19c for holding a centrally located, cylindrical shaped shaft support 19d, within which is a non-metallic (preferably Teflon) bearing or bushing 21 to facilitate free rotation of shaft 22.

A flat, annular-shaped metering plate 25 is supported on plate 19b of base 19. As will be made apparent, the particulate material held by hopper 14 will be accurately metered through the orifice or aperture provided by metering plate 25. The delivery rate is a function of the orifice size and the rotation speed of the metering rotor 27 which is to be described. Hence, a desired feed rate may be obtained merely by selecting the correct rotation speed and by selecting a plate 25 with the required orifice size. Of course, the maximum orifice size of plate 25 is limited by the orifice of plate 19b. Moreover, and as will be explained later, for a given particulate material the orifice size of plate 25 is also restricted by the angle of repose of that material.

Rotatably mounted immediately above metering plate 25 is metering rotor 27 which has three arms 27a extending radially outward, although it will be apparent that the feeding mechanism will operate even if rotor 27 has only one arm. The particular construction of each arm 27a provides reinforcement and yet prevents accumulation of particulate material on top of the rotor. The hexagonal shaped hub 27b of the metering rotor is fixed to shaft 22, by virtue of slot 27c and dowel pin 28, so that rotation of shaft 22 effects concurrent rotation of metering rotor 27. Slot 27c permits the rotor to be moved axially relative to the shaft to facilitate disassembling and cleaning. Easy disassembling is particularly desirable to permit cleaning when food materials are handled. Note (see particularly FIG. 2) that the bottom of hub 27b rides on the top of Teflon bushing 21 which extends above the upper surface of plate 25. With this arrangement, a desired clearance may be provide between the rotatably mounted rotor 27 and the stationary metering plate 25.

Figure 6:
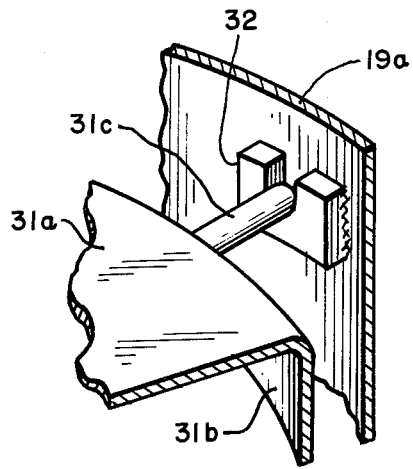
FIG. 6 is a fragmentary perspective view showing the manner in which one of the parts is supported.

A stationary pressure relief, inverted pan-shaped member 31 is mounted above rotor 27. It has a horizontally-disposed circular, flat support plate 31a and a cylindrical guide wall 31b extending vertically downwardly from the plate's circular periphery. Pressure relief member 31 is held in position by means of three supports 31c attached to the wall 31b (such as by welding) and which rest in respective ones of three saddles 32 attached (also such as by welding) to wall 19a of base 19. This is best seen in FIG. 6. In this way, pressure relief member 31 may be disassembled from the feeding mechanism merely by lifting it out of the slots in the three saddles 32. A hub 31d, rigidly affixed to the center of support plate 31a, has a non-metallic (preferably Teflon) bushing or bearing 33 therewithin for receiving shaft 22. The shaft may thus rotate within bushing 33 which remains stationary with pressure relieve member 31. A desired clearance is provided between rotor 27 and guide wall 31b.

Figure 2:
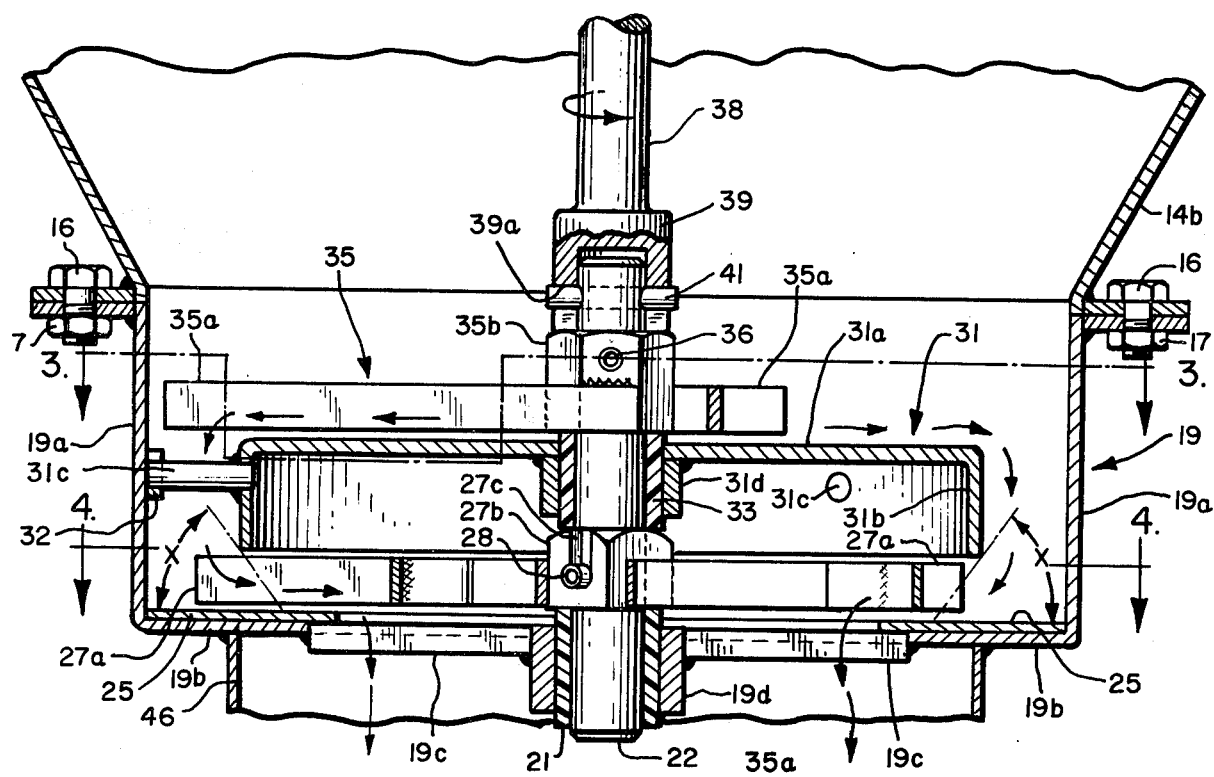
FIG. 2 is a fragmentary sectional view taken along the section line 2—2 in FIG. 1.

Rotatably mounted immediately above support plate 31a is an agitator 35 having three radially extending arms 35a. More specifically, agitator 35 has a hexagonal shaped hub 35b rigidly affixed to shaft 22 by means of dowel pin 36. Hence, agitator 35 rotates when shaft 22 is driven, thereby rotating in unison or concurrently with metering rotor 27. As best seen in FIG. 2, a desired clearance is maintained between agitator 35 and support plate 31a by Teflon bushing 33. As in the case of rotor 27, agitator 35 will perform its required function even if it has only one arm.

Dowel pin 41 extends through shaft 22 at its upper end and is received by slot 39a of a coupling 39 which is rigidly affixed to the lower end of a shaft 38. With this coupling arrangement, shafts 38 and 22 are locked together for concurrent rotation. Shaft 38 is driven by an electric motor 42 via a speed reducer 43 both of which are mounted above storage hopper 14. Motor 42 and speed reducer 43 are designed to provide relatively slow rotation of shafts 22 and 38 and consequently agitator 35 and rotor 27, nominally two to sixty revolutions per minute. At such low speeds, no significant centrifugal forces are produced. Circuitry for controlling the energization of motor 42 has not been shown in order to avoid unduly encumbering the drawings. A variety of solid state control circuits, readily known to one skilled in the art, are available for controlling the motor in order to rotate agitator 35 and metering rotor 27 a precise number of revolutions. In fact, such well known solid state control circuitry can effect rotation of agitator 35 and rotor 27 to the accuracy of small fractions of a revolution.

Figure 4:
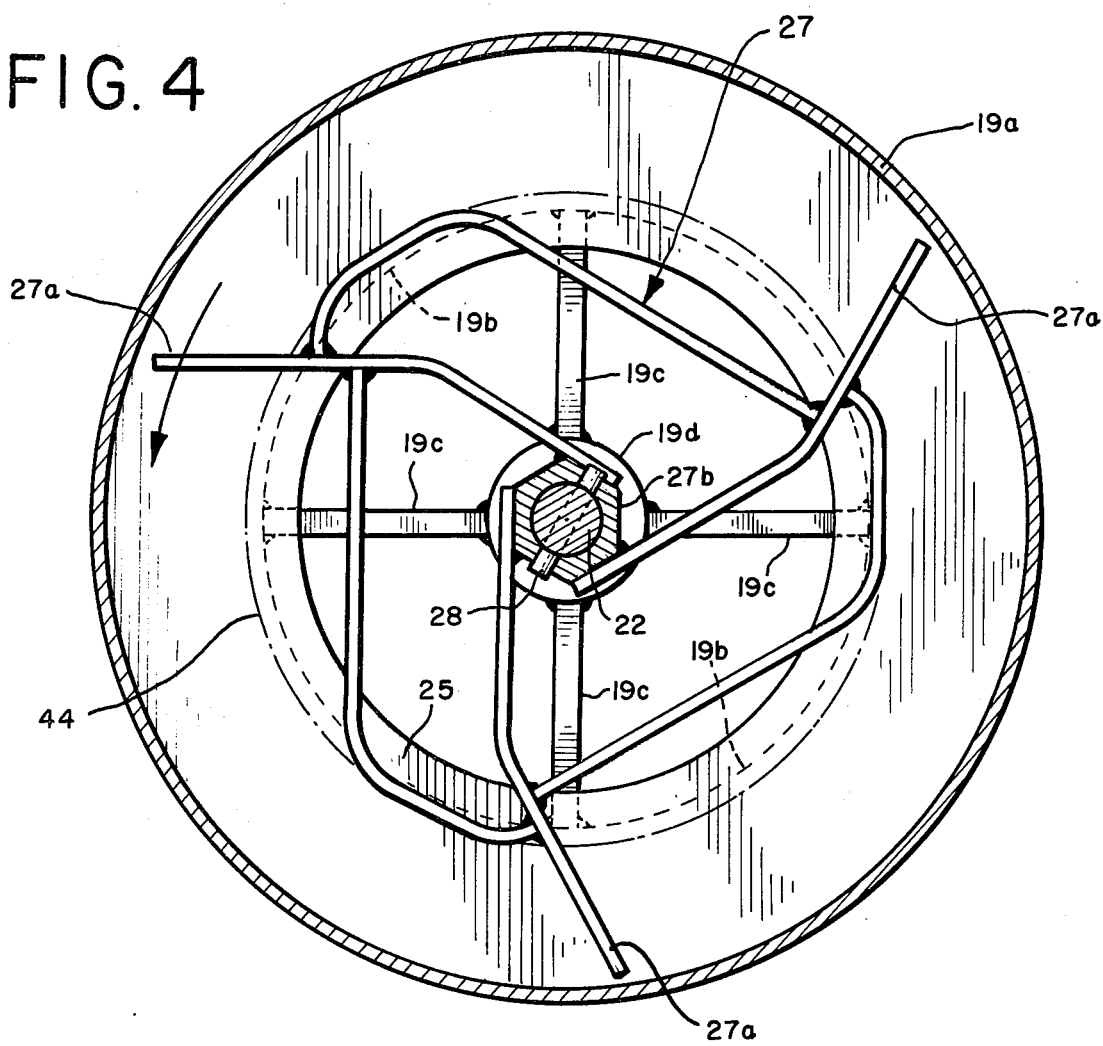
FIG. 4 is a sectional view taken along the section line 4—4 in FIG. 2.

In operation of the volumetric feeder, the specific particulate material to be metered is initially loaded into storage hopper 14 in its uncompacted state, most of the weight of this material being borne by support plate 31a of stationary pressure relief member 31. Some of the uncompacted material will fall between the outside of guide wall 31b and the inside of wall 19a and will land on an annular-shaped area on metering plate 25. Since guide wall 31b is spaced apart from plate 25, the particulate material will form a mound on the plate, the base of the mound spreading out radially inward to a point well underneath pressure relief member 31. The extent to which the material spreads out is determined by the material's angle of repose, which will differ from one particulate material to the next. As is well known, the angle of repose is that between the sloping surface of the mound and the horizontal plane on which it rests. For illustrative purposes and by way of example, the angle labeled x in FIG. 2 is the angle of repose for a given particulate material. Assuming that the mound spreads out in accordance with that angle x, this means that the annular-shaped support area around metering plate 25 will be that illustrated in FIG. 4 between the circular dashed construction line 44 and the outer circumference of plate 25. Note that the orifice provided by plate 25 is smaller than the circle defined by dashed construction line 44. In other words, the base of the mound will not spread out radially inward to the orifice in metering plate 25. Of course, this is a necessary restriction on the size of the orifice. Otherwise, the particulate material would pour continuously from hopper 14 and through the metering orifice when agitator 35 and rotor 27 are stationary.

Assume now that it is desired to feed a precise volume of the particulate material through the discharge orifice provided by metering plate 25 and into the collecting hopper 45 which is mounted below support deck 10 and couples to base 19 via a series of cylindrical shaped coupling members 46, 47 and 48. These coupling devices facilitate easy disassembly. Hopper 45 may retain the metered material for later use or it may feed the material to any appropriate station or distribution system. For example, the material flowing through the lower end of hopper 45 may be delivered to some remote station via a pneumatic conveying system.

Figure 5:
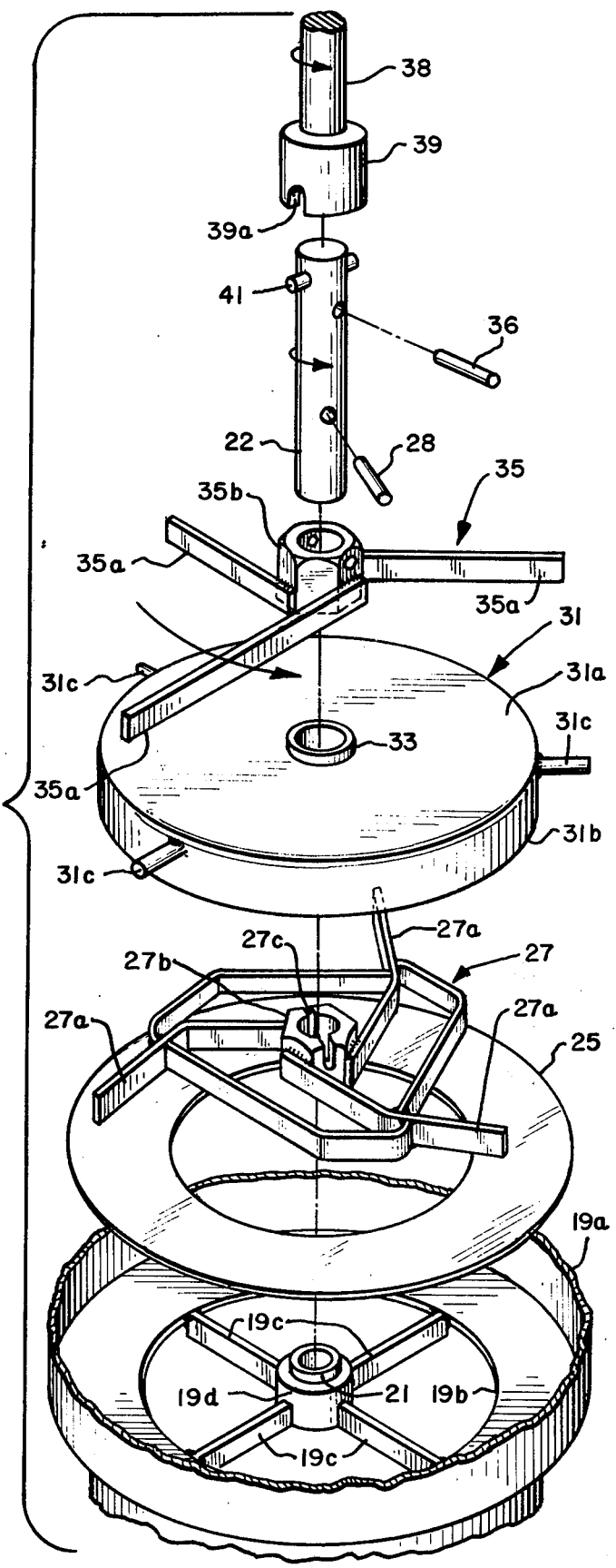
FIG. 5 is a perspective, exploded view of a portion of the feeder of FIG. 1.
Figure 3:
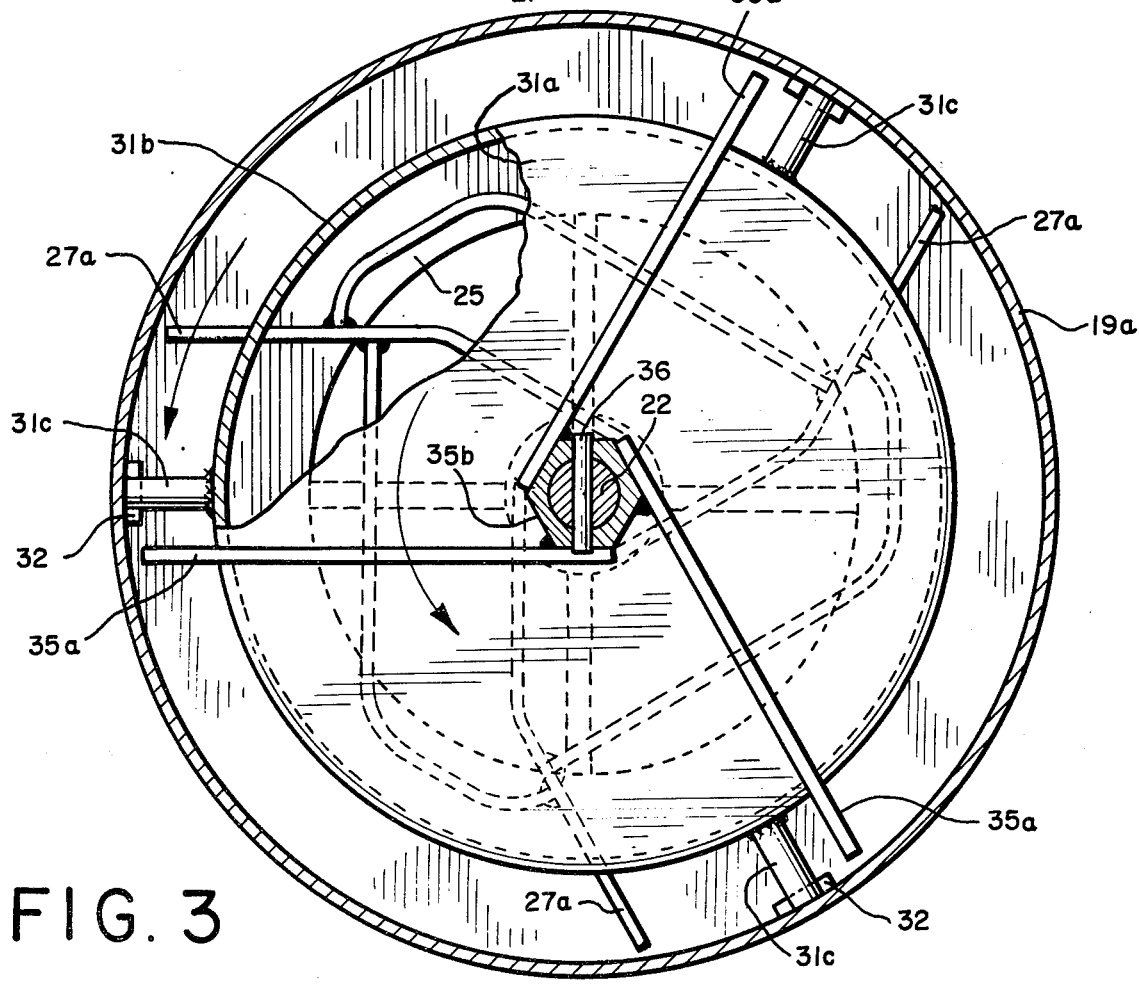
FIG. 3 is a sectional view taken along the section line 3—3 in FIG. 2.

In order to meter an accurate quantity of material to hopper 45, motor 42 will be energized to drive shafts 38 and 22, and consequently agitator 35 and rotor 27, a precise number of revolutions. These elements are driven counterclockwise (as viewed in FIGS. 3, 4 and 5), the agitator thereby sweeping the particulate material radially outward while the rotor sweeps the material radially inward. To explain, arms 35a extend beyond the periphery of support plate 31a and are so shaped that they move the material radially outward so that it flows down the outside of guide wall 31b, under the action of gravity, and onto the annular-shaped support area on metering plate 25, namely the area defined between dashed line 44 and the outer circumference of plate 25 in FIG. 4. At the same time, arms 27a of rotor 27 extend beyond wall 31b and are shaped to draw the material radially inward from the support area and through the discharge orifice in plate 25 to hopper 45.

With this arrangement, the particulate material will always be maintained in an uncompacted, homogeneous condition and any precise quantity can be metered merely by selecting the required number of revolutions of agitator 35 and metering rotor 27. The feeding mechanism may be quickly and easily disassembled for cleaning or when it is desired to replace plate 25 with one having a different size discharge orifice, as may be the case when a particulate material having a different angle of repose is to be metered. The replaceability of plate 25 provides greater flexibility.

Figure 7:
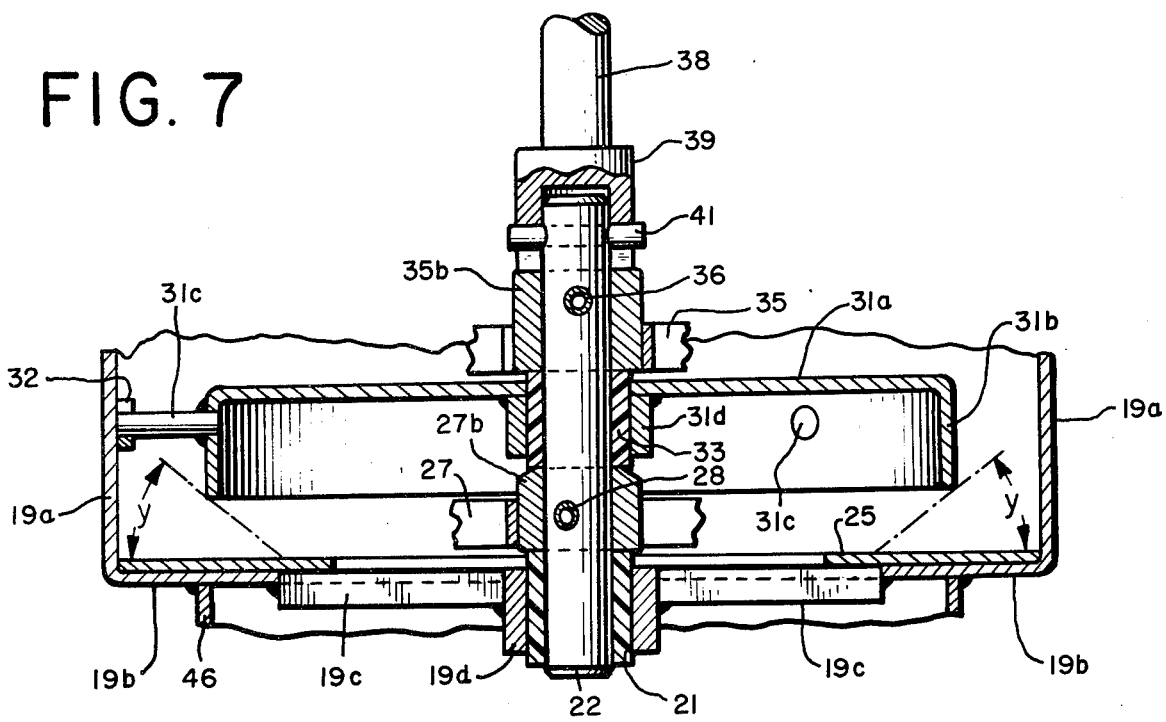
FIG. 7 is a fragmentary sectional view illustrating the manner in which one of the parameters of the feeder may be changed.

FIG. 7 repeats a portion of the sectional view of FIG. 2 except that it includes a metering plate 25 with a discharge orifice considerably smaller than that illustrated in FIGS. 1-6. This is necessary since FIG. 7 depicts the arrangement that may be employed with a particulate material having an angle of repose (labeled y) much smaller than that assumed in the discussion of FIGS. 1-6.

It is to be noted that the pressure relief member 31 need not be pan-shaped, but may merely comprise a circular flat plate, in which case the arms of agitator 35 would sweep the material radially outward and off the plate's edge.

While a particular embodiment of the invention has been shown and described, modifications may be made, and it is intended in the appended claims to cover all such modifications as may fall within the true spirit and scope of the invention.

I claim:

1. A volumetric feeder for metering particulate material, comprising:
    a stationary pressure relief member having a horizontally-disposed, circular, flat support plate and a cylindrical guide wall depending therefrom;
    means for maintaining particulate material on said support plate;
    a rotatably mounted agitator above said support plate for sweeping the particulate material radially outward so that it flows down said guide wall;
    a horizontally-disposed stationary circular, flat metering plate, having a centrally located discharge orifice, mounted below said pressure relief member for receiving and supporting the particulate material flowing down said guide wall;
    and a metering rotor, rotatably mounted between said pressure relief member and said metering plate, for sweeping the particulate material radially inward over said metering plate and through said discharge orifice.

2. A volumetric feeder according to claim 1 and including means for rotating said agitator and said metering rotor in unison.

3. A volumetric feeder for metering particulate material, comprising:
    a stationary pressure relief, inverted pan-shaped member having a horizontally-disposed circular, flat, support plate and a cylindrical guide wall extending vertically downwardly from the plate's circular periphery;
    a storage hopper for maintaining a supply of particulate material on said support plate;
    an agitator, rotatably mounted immediately above and at the center of said circular support plate, for moving the particulate material radially outward so that it flows over the plate's circular periphery and down the outside of said cylindrical guide wall under the action of gravity;
    a horizontally-disposed stationary circular flat metering plate mounted below and spaced from said cylindrical guide wall of said pressure relief member and having a diameter greater than that of the cylindrical wall to provide an annular-shaped support area for supporting the particulate material that flows down the outside of said cylindrical guide wall, the inner diameter of the annular-shaped support area being less than the diameter of said cylindrical guide wall to permit the particulate material to spread out on the support area and form a mound having an angle of repose determined by the material,
    said metering plate having a generally circular, centrally located discharge orifice which has a diameter less than the inner diameter of the annular-shaped support area;
    and a metering rotor, rotatably mounted between said cylindrical guide wall and said metering plate and on the same axis as said agitator, having a plurality of arms extending radially outward beyond said cylindrical guide wall and above the annular-shaped support area on said metering plate,
    said arms being shaped to sweep the particulate material radially inward from the support area and through said discharge orifice, the volume of the material flowing through said discharge orifice being directly proportional to the number of revolutions of said metering rotor.

4. A volumetric feeder according to claim 3 wherein the metering plate is removably mounted on a circular supporting structure having a centrally located circular aperture which lies below, and is larger than, the discharge orifice, thereby permitting different metering plates, with different size discharge orifices, to be used for metering different particulate materials having different angles of repose.

5. A volumetric feeder according to claim 3 and including a collecting hopper for receiving the particulate material that flows through said discharge orifice.

6. A volumetric feeder according to claim 3 wherein said agitator and said metering rotor are driven in unison by a motor mounted above said pressure relief member.

7. A volumetric feeder according to claim 1 wherein said agitator includes at least one radially extending arm.

8. A volumetric feeder according to claim 1 wherein said metering rotor has at least one radially extending arm.

9. A volumetric feeder for metering particulate material, comprising:
    a stationary pressure relief member having a horizontally-disposed, circular, flat support plate;
    means for maintaining particulate material on said circular support plate;
    a rotatably mounted agitator above said circular support plate for sweeping the particulate material radially outward to the periphery of the circular support plate so that it falls off the plate's edge;
    a horizontally-disposed stationary circular, flat metering plate, having a centrally located discharge orifice, mounted below said pressure relief member for receiving and supporting the particulate material flowing down from the edge of said circular support plate;
    and a metering rotor, rotatably mounted between said pressure relief member and said metering plate, for sweeping the particulate material radially inward over said metering plate and through said discharge orifice.

* * * * *